March 31, 1925.  S. CHAZEN  1,532,039
SCALDING TANK
Filed July 11, 1924   4 Sheets-Sheet 1
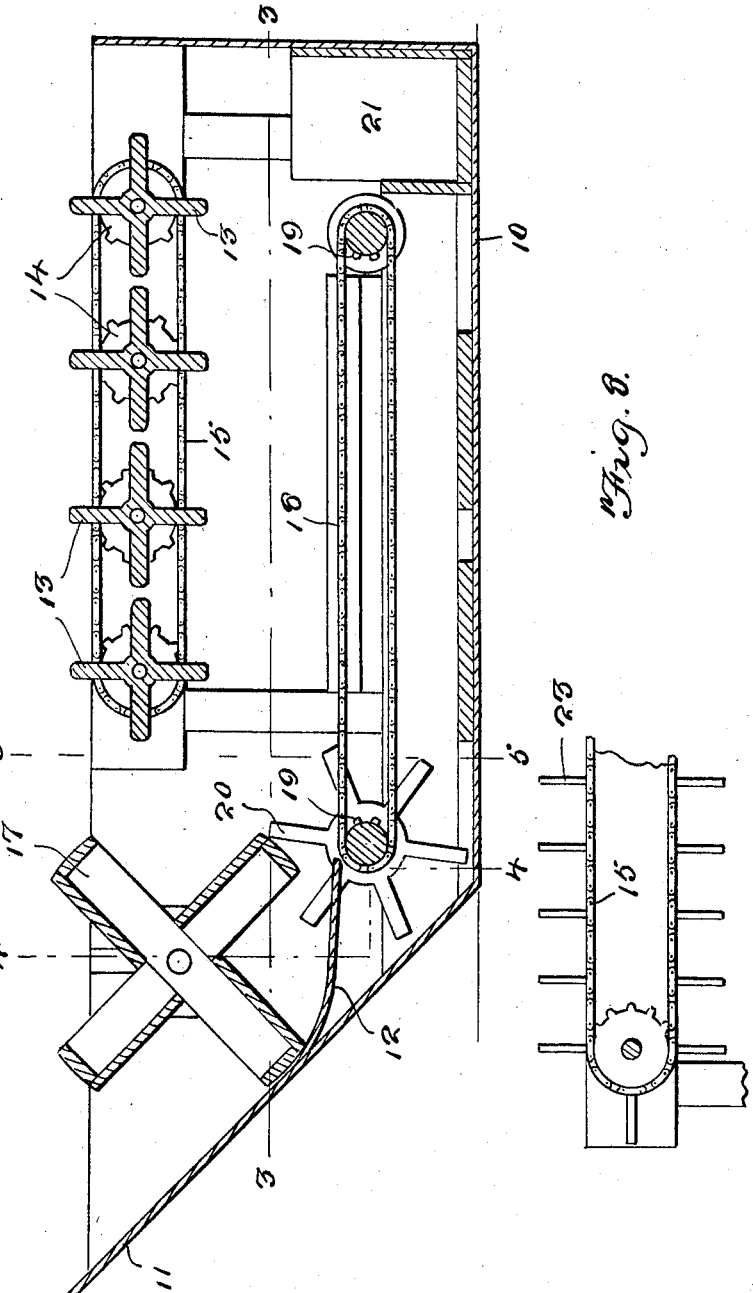
Samuel Chazen
INVENTOR
BY Victor J. Evans
ATTORNEY March 31. 1925.
S. CHAZEN
SCALDING TANK
Filed July 11, 1924  4 Sheets-Sheet 2
1,532,039
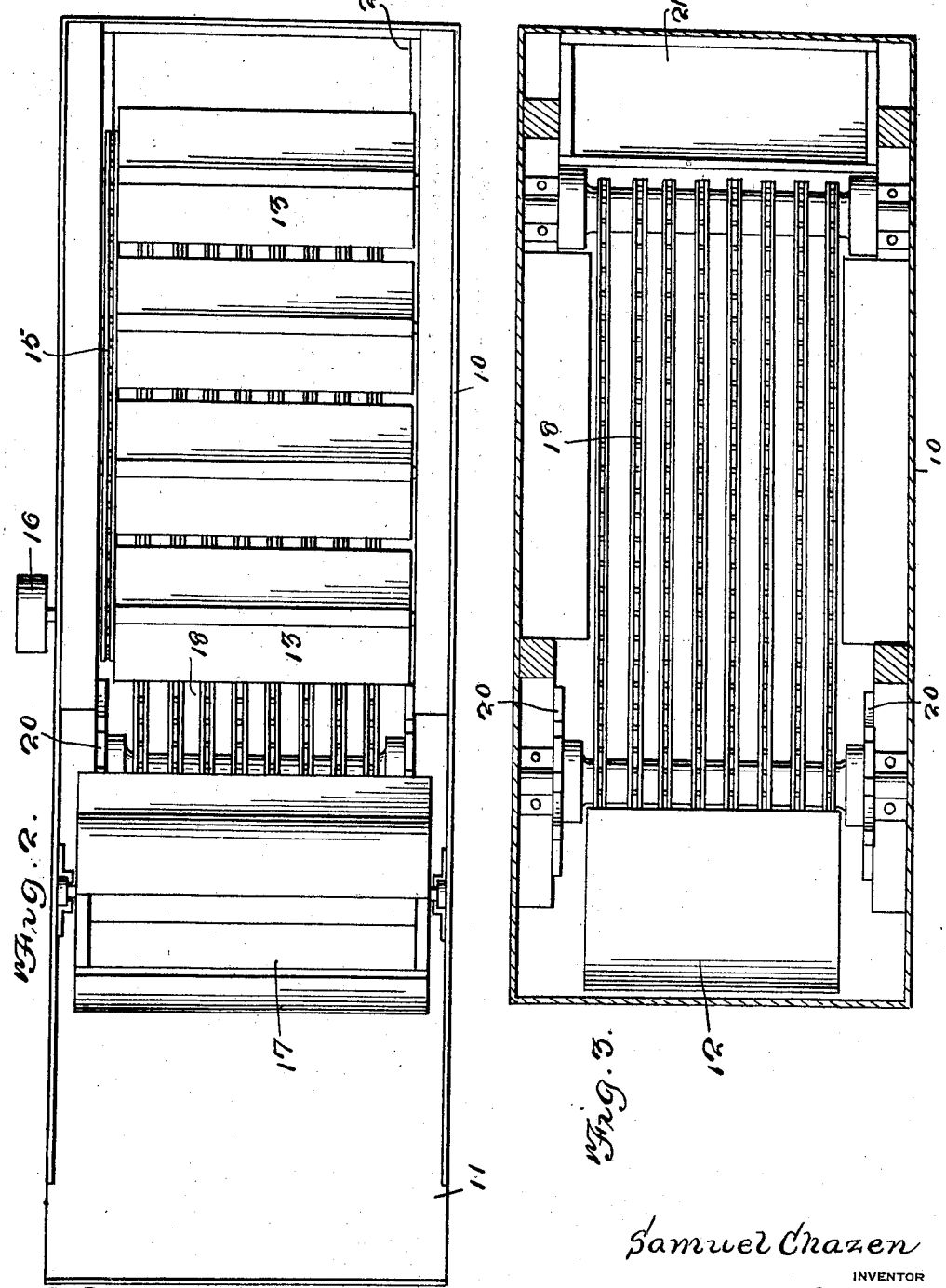

March 31, 1925.
S. CHAZEN
SCALDING TANK
Filed July 11, 1924
1,532,039
4 Sheets-Sheet 3
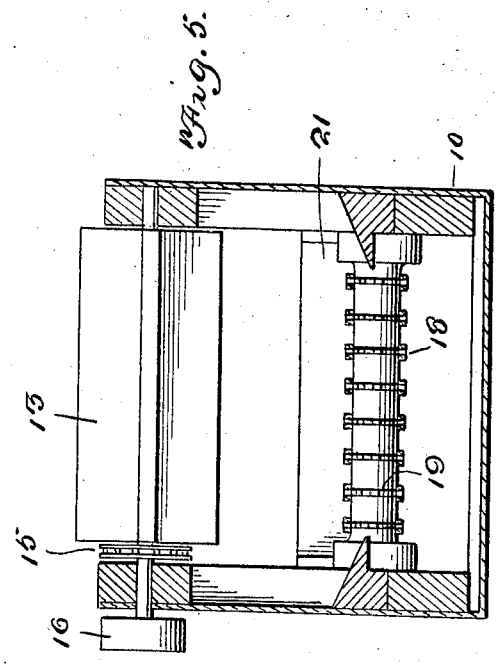
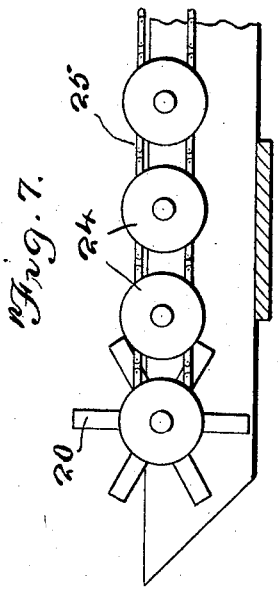
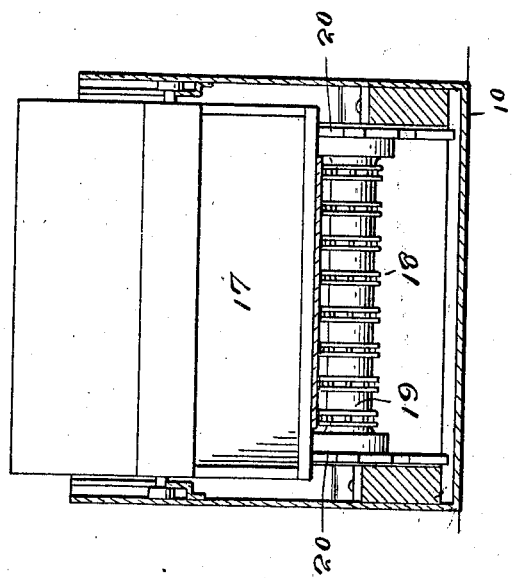
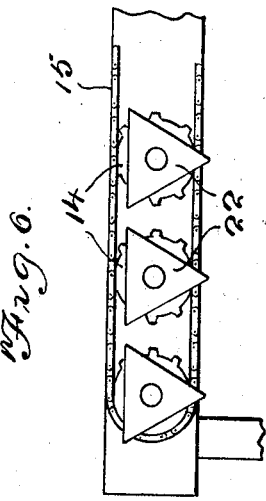
Samuel Chazen
INVENTOR
BY Victor J. Evans
ATTORNEY
WITNESS:

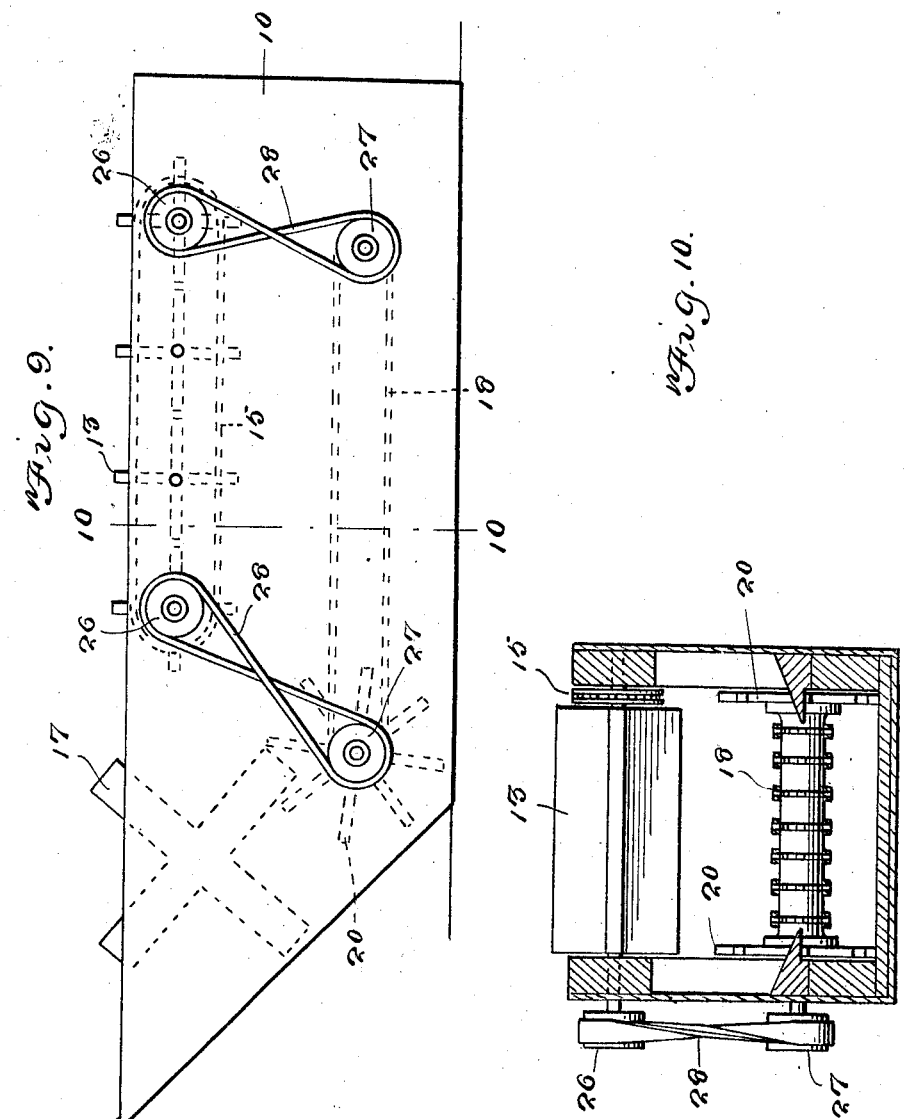

Patented Mar. 31, 1925.

1,532,039

UNITED STATES PATENT OFFICE.

SAMUEL CHAZEN, OF MASON CITY, IOWA.

SCALDING TANK.

Application filed July 11, 1924. Serial No. 725,478.

*To all whom it may concern:*

Be it known that I, SAMUEL CHAZEN, a citizen of the United States, residing at Mason City, in the county of Cerro Gordo and State of Iowa, have invented new and useful Improvements in Scalding Tanks, of which the following is a specification.

This invention relates to improvements in tanks for scalding carcasses of such animals as hogs for the removal of the hair or bristles, an object being to provide a scalding tank into which the carcasses are introduced for the purpose of submerging them in scalding water during the passage of the said carcasses from one end of the tank to the other.

Another object of the invention is the provision of means located at one end of the tank for separating the carcasses so that they will not pass through in groups or bunches, the separation facilitating their passage through the water and their removal from the tank after being subjected to the scalding treatment.

Another object of the invention is the provision of means for moving the carcasses from the entrance to the exit end of the tank, the said means providing for the movement of both floating and sinking carcasses, the same being known to the trade as "floaters" and "sinkers". These latter occur at intervals and unless provision is made for taking care of the same they remain within the scalding water too long and are "cooked" and are therefore unfit for use except as a fertilizer.

Another object of the invention is the provision of means whereby the separating means of the carcasses is utilized to actuate the conveying means so that no auxiliary power is required for this purpose.

A further object of the invention is the provision of means for holding the sunken carcasses at the exit or removal end of the tank, whereby the attendants may readily ascertain the presence of "sinkers" and remove them before "cooking" occurs.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of a scalding tank constructed in accordance with the invention.

Figure 2 is a top plan view of the same.

Figure 3 is a section on the line 3—3 of Figure 1.

Figures 4 and 5 are similar views on the lines 4—4 and 5—5 respectively of Figure 1.

Figure 6 is a fragmentary elevation of a modified form of "floater" conveyor.

Figure 7 is a similar view of a modified form of "sinker" conveyor.

Figure 8 is a like view of still another form of "floater" conveyor.

Figure 9 is a side elevation of a modified form of tank.

Figure 10 is a section on the line 10—10 of Figure 9.

Referring to the drawings in detail wherein like characters of reference denote corresponding parts, the reference character 10 indicates a tank of suitable size and material which is shown as open at the top and provided at one end with an inclined wall 11 whose outer end preferably extends beyond the upper edge of the tank while extending from this wall 11 is an inwardly disposed substantially horizontal extension 12 which together with the wall 11 provides a chute down which the carcass is slid when being placed within the tank.

Extending horizontally across the tank are spaced blades 13, the latter being diametrically disposed and extending for an appreciable distance below the surface of water placed within the tank when the latter is in use. These blades 13 are mounted upon transverse shafts and secured upon these shafts are sprockets 14 over which pass a chain 15 so that the paddles may be simultaneously moved in the same direction. Any suitable means may be provided for operating the paddles, the means shown consisting of a pulley 16 which is mounted upon one of the paddle shafts and which may be driven from any suitable source of power.

Mounted in suitable bearings at the chute end of the tank is a rotatable member which includes diametrically arranged arms having individual pockets 17 therein arranged as shown in Figure 1 of the drawings. By reference to this figure it will be seen that the carcasses passing down the chute will enter one of these pockets, the weight of the carcasses causing the member to rotate so that the carcasses will pass into the scalding water in a direction toward the opposite end of the tank. If the carcass is a "floater" it will rise and will be engaged by the revolving blades 13 and will be moved in a direction toward the opposite end of the tank where it may be removed in any suitable manner, the time consumed in the passage of the carcass from one to the other end of the tank being sufficient to remove the hair. In addition to moving the carcass longitudinally of the tank, the arrangement of the blades 13 provides means for keeping the carcass entirely submerged, which is an important feature of the invention in that the entire carcass is treated during its travel through the tank. In addition, the pockets 17 of the rotatable member act to separate the carcasses and provide a sufficient interval of time between said carcasses so that they may be removed in the order in which they travel through the tank and thus provide for a uniform treatment of each carcass.

Should any of the carcasses prove to be "sinkers," they are conveyed to the opposite end of the tank by a conveyor which includes spaced chains 18. These chains pass around sprockets 19 at opposite ends of the tank. One set of sprockets 19, that is, the set at the chute end of the tank has connected thereto at opposite sides of the tank, spaced radially disposed arms 20. These arms are adapted to be engaged by the pocket forming rotatable member, so that as each carcass enters the tank, the arms of the said rotatable member which separate the carcasses engage the arms 20 and impart a step by step motion to the chains 18, so that any carcass upon the chain conveyor will be moved toward the opposite end of the tank without the use of any auxiliary power.

At this last mentioned end of the tank there is provided a compartment 21 into which the "sinkers" will drop, so that the said "sinkers" will remain at this end of the tank and an attendant may readily determine the presence of a "sinker" in time to permit of its removal before the carcass is "cooked."

In the modification shown in Figure 6 of the drawings substantially triangular-shaped members 22 are substituted for the blades 13, the said members 22 functioning in the same manner as the blades.

In Figure 8 there is provided a still further modified form in which the chain 15 has extending therefrom spaced arms or fingers 23 having a function similar to the blades 13 and the members 22.

In Figure 7 there is illustrated a modified form of "sinker" conveyor in which there is provided a plurality of spaced rollers 24 which are driven by a chain 25, the latter being operated by the spaced radial arms 29 as previously explained.

In Figures 9 and 10 there is illustrated a modified form of tank in which the conveyor for the "sinkers" is operated by the weight of the carcasses through the operation of the rotatable member at the feed end of the tank. This member engages the radially disposed arms 20 as in the first described form of the invention, but instead of providing a separate drive means for the blades 13 which engage the "floaters," the shafts of each end of the rotatable blades or "floater" conveyor have secured thereon pulleys 26. The shafts at each end of the "sinker" conveyor have secured thereon pulleys 27 and these pulleys are connected to the pulleys 26 by means of belts 28. When the "sinker" conveyor is operated by the weight of the carcasses fed into the tank, as previously described, the "sinker" conveyor will be driven through the medium of the pocket carrying rotatable member, while the "floater" conveyor will be driven from the "sinker" conveyor. The pulley 16 of the preceding form of the invention may thus be dispensed with and both conveyors operated without the use of any outside power.

The invention is susceptible of various changes in its form, proportions and minor details of construction and the right is herein reserved to make such changes as properly fall within the scope of the appended claims.

Having described the invention what is claimed is:—

1. In a carcass scalding tank, a chute at one end of the tank, means located at said end for separating the carcasses as they enter the tank and movable means at the top of the tank for moving the carcasses toward the opposite end of the tank.

2. In a carcass scalding tank, a chute at one end of the tank, means located at said end and operated by the weight of the carcasses for separating the carcasses as they enter the tank and means for moving the carcasses to the opposite end of the tank.

3. In a carcass scalding tank, a chute at one end of the tank, means located at said end for separating the carcasses as they enter the tank and means for moving the floating carcasses to the oposite end of the tank.

4. In a carcass scalding tank, a chute at one end of the tank, means located at said end for separating the carcasses as they enter the tank, means for moving the floating carcasses to the opposite end of the tank and means for moving sunken carcasses to said end.

5. In a carcass scalding tank, a chute at one end of the tank, means located at said end for separating the carcasses as they enter the tank, means for moving the floating carcasses to the opposite end of the tank, means for moving sunken carcasses to said end and a separate compartment at said opposite end to receive the carcasses and prevent movement of the latter in an opposite direction.

6. In a carcass scalding tank, a chute at one end of the tank, a rotatably mounted paddle wheel located at said end, and associated with the chute for separating the carcasses as they enter the tank and means for moving the carcasses to the opposite end of the tank.

7. In a carcass scalding tank, a chute at one end of the tank, a plurality of radially disposed individual carcass receiving pockets rotatably mounted at the chute end of the tank for separating the carcasses as they enter the tank and means for moving the carcasses to the opposite end of the tank.

8. In a carcass scalding tank, a chute at one end of the tank, and means located at said end for separating the carcasses as they enter the tank and combined submerging and carcass moving means mounted within the tank for moving the carcasses to the opposite end of the tank.

9. In a carcass scalding tank, a chute at one end of the tank, means located at said end for separating the carcasses as they enter the tank and horizontally movable means mounted within the tank and operated by the carcass separating means for submerging and moving the carcasses to the opposite end of the tank.

10. In a carcass scalding tank, a chute at one end of the tank, means located at said end for separating the carcasses as they enter the tank, horizontally disposed spaced rotatably mounted elements located within the tank for submerging and moving the carcasses to the opposite end of the tank and means whereby said elements may be rotated.

11. In a carcass scalding tank, a chute at one end of the tank, means located at said end for separating the carcasses as they enter the tank, a conveyor within the tank for moving the carcass to the opposite end of said tank and means operated by the carcass separating means for actuating the conveyor.

12. In a carcass scalding tank, a chute at one end of the tank, means located at said end for separating the carcasses as they enter the tank, a conveyor within the tank for moving the carcass to the opposite end of said tank and means including spaced radially disposed arms operatively connected to the conveyor and engaged by the carcass separating means for actuating the conveyor.

In testimony whereof I affix my signature.

SAMUEL CHAZEN.